(12) United States Patent
Quillen et al.

(10) Patent No.: US 10,346,138 B1
(45) Date of Patent: Jul. 9, 2019

(54) GRAPH CLASS APPLICATION PROGRAMMING INTERFACES (APIS)

(71) Applicant: The MathWorks, Inc., Natick, MA (US)

(72) Inventors: Patrick D. Quillen, Shrewsbury, MA (US); Antonio C. Ionita, Framingham, MA (US); Duncan Po, Newton, MA (US); Christine Tobler, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 113 days.

(21) Appl. No.: 14/984,942

(22) Filed: Dec. 30, 2015

(51) Int. Cl.
*G06F 8/30* (2018.01)
*G06F 16/901* (2019.01)

(52) U.S. Cl.
CPC .......... *G06F 8/315* (2013.01); *G06F 16/9024* (2019.01)

(58) Field of Classification Search
CPC .......... G06F 8/00–8/78; G06F 16/9024; G06F 16/9027
See application file for complete search history.

(56) References Cited

U.S. PATENT DOCUMENTS

| | | | | |
|---|---|---|---|---|
| 5,974,254 A * | 10/1999 | Hsu | | G06F 8/71 714/37 |
| 2004/0090439 A1 * | 5/2004 | Dillner | | G06K 9/00402 345/440 |
| 2006/0059461 A1 * | 3/2006 | Baker | | G06F 8/20 717/113 |
| 2007/0018986 A1 * | 1/2007 | Hauser | | G06T 11/206 345/440 |
| 2008/0162552 A1 * | 7/2008 | Bonev | | G06F 8/75 |
| 2015/0127650 A1 * | 5/2015 | Carlsson | | G06F 17/30663 707/737 |
| 2015/0169758 A1 * | 6/2015 | Assom | | G06F 17/30731 707/603 |
| 2016/0055261 A1 * | 2/2016 | Reinhardt | | G06F 17/30958 707/798 |
| 2017/0109907 A1 * | 4/2017 | Hamedani | | G06T 11/206 |

OTHER PUBLICATIONS

Barnwal, "Graph and its representations", http://www.geeksforgeeks.org/graph-and-its-representations/, Published Nov. 13. 2012, Retrieved Jun. 25, 2017.*

(Continued)

*Primary Examiner* — Chameli Das
*Assistant Examiner* — Joanne G Macasiano
(74) *Attorney, Agent, or Firm* — Wolf, Greenfield & Sacks, P.C.

(57) ABSTRACT

A device may receive a command to create an object. The object may be associated with representing a set of nodes. A first node, of the set of nodes, may be connected to a second node, of the set of nodes via an edge, of a set of edges. The device may create, based on the command, the object. The object may include a sparse matrix associated with representing the set of nodes and the set of edges. The object may include a first table associated with representing a set of properties associated with the set of nodes. The object may include a second table associated with representing a set of properties associated with the set of edges. The device may store the object.

21 Claims, 16 Drawing Sheets

(56) References Cited

OTHER PUBLICATIONS

Sanfoundry.com, "C Program to Represent Graph Using Adjacency Matrix", http://www.sanfoundry.com/c-program-represent-graph-adjacency-matrix/, Archived Jul. 31, 2014, Retrieved Jun. 25, 2017.*

Souter, Arnie L., et al. "TATOO: Testing and analysis tool for object-oriented software." International Conference on Tools and Algorithms for the Construction and Analysis of Systems. Springer, Berlin, Heidelberg. (Year: 2001).*

Gansner, Emden R., and Stephen C. North. "An open graph visualization system and its applications to software engineering." Software: practice and experience 30.11 p. 1203-1233. (Year: 2000).*

NetworkX, "High-productivity software for complex networks," https://networkx.github.io/, Oct. 13, 2011, 1 page.

Wolfram, "Graph," https://reference.wolfram.com/language/ref/Graph.html, Aug. 25, 2014, 3 pages.

Igraph, "Python-igraph Manual," http://igraph.org/python/doc/tutorial/tutorial.html, Sep. 7, 2009, 22 pages.

Gephi, "Features," https://gephi.org/features/, Feb. 9, 2010, 4 pages.

Graphmatica, "Graphmatica . . . ," http://www.graphmatica.com/, Feb. 1, 2001, 2 pages.

Gleich, "MatlabBGL," http://www.mathworks.com/matlabcentral/fileexchange/10922-matlabbgl, Oct. 22, 2008, 11 pages.

Boost C++ Libraries, "The Boost Graph Library (BGL)," http://www.boost.org/doc/libs/1_60_0/libs/graph/doc/index.html, Nov. 26, 2010, 4 pages.

\* cited by examiner

TCE 220

File   Edit   Tools   View   Execute

>>G = graph; ~410

>>G = addedge (G, [1 2], [2 3]) ~420

G = graph with properties:

Edges: [2x1 table]
Nodes: [3x0 table]

>>G.Edges ~430 ans =

EndNodes
━━━━━━━━
 1   2
 2   3

FIG. 4

TCE 220

File  Edit  Tools  View  Execute

```
A = foo(4);                    ~510
A(A > 10) = 0

A =
     0    2    3    0
     5    0   10    8
     9    7    6    0
     4    0    0    1 names = {'alpha' 'beta' 'gamma' 'delta'};    ~520
G = digraph(A,names,'OmitSelfloops')

G =
  digraph with properties:

Edges: [8x2 table]
    Nodes: [4x1 table]
```

FIG. 5A

```
TCE 220                                    _ □ ×
File  Edit  Tools  View  Execute >>G.Edges  ─530 ans =

EndNodes              Weight
    'alpha'    'beta'       2
    'alpha'    'gamma'      3
    'beta'     'alpha'      5
    'beta'     'gamma'      10
    'beta'     'delta'      8
    'gamma'    'alpha'      9
    'gamma'    'beta'       7
    'delta'    'alpha'      4

>>G.Nodes  ─540 ans=

Name
    'alpha'
    'beta'
    'gamma'
    'delta'
```

FIG. 5B

TCE 220

File　Edit　Tools　View　Execute

Graph Assignment

Task 1
The following map is a part of the coverage map of the United Airlines in the US. Create a graph to represent this map.

```
         $641      Boston
Cleveland ———————————
  |                    \ $466
$511|                    \
  |        $574        New York
  |      ————————————    |
Chicago                  | $401
  |                      |
$999|                    DC
  |       $381
Cincinnati ——————————————
```

```
G = graph;
G = addedge(G, 'Boston', 'New York', 466);
G = addedge(G, 'Boston', 'Cleveland', 641);
G = addedge(G, 'New York', 'DC', 401);
G = addedge(G, 'New York', 'Cleveland', 574);
G = addedge(G, 'DC', 'Cincinnati', 381);
G = addedge(G, 'Cincinnati', 'Chicago', 999);
G = addedge(G, 'Chicago', 'Cleveland', 511);
```

FIG. 8A

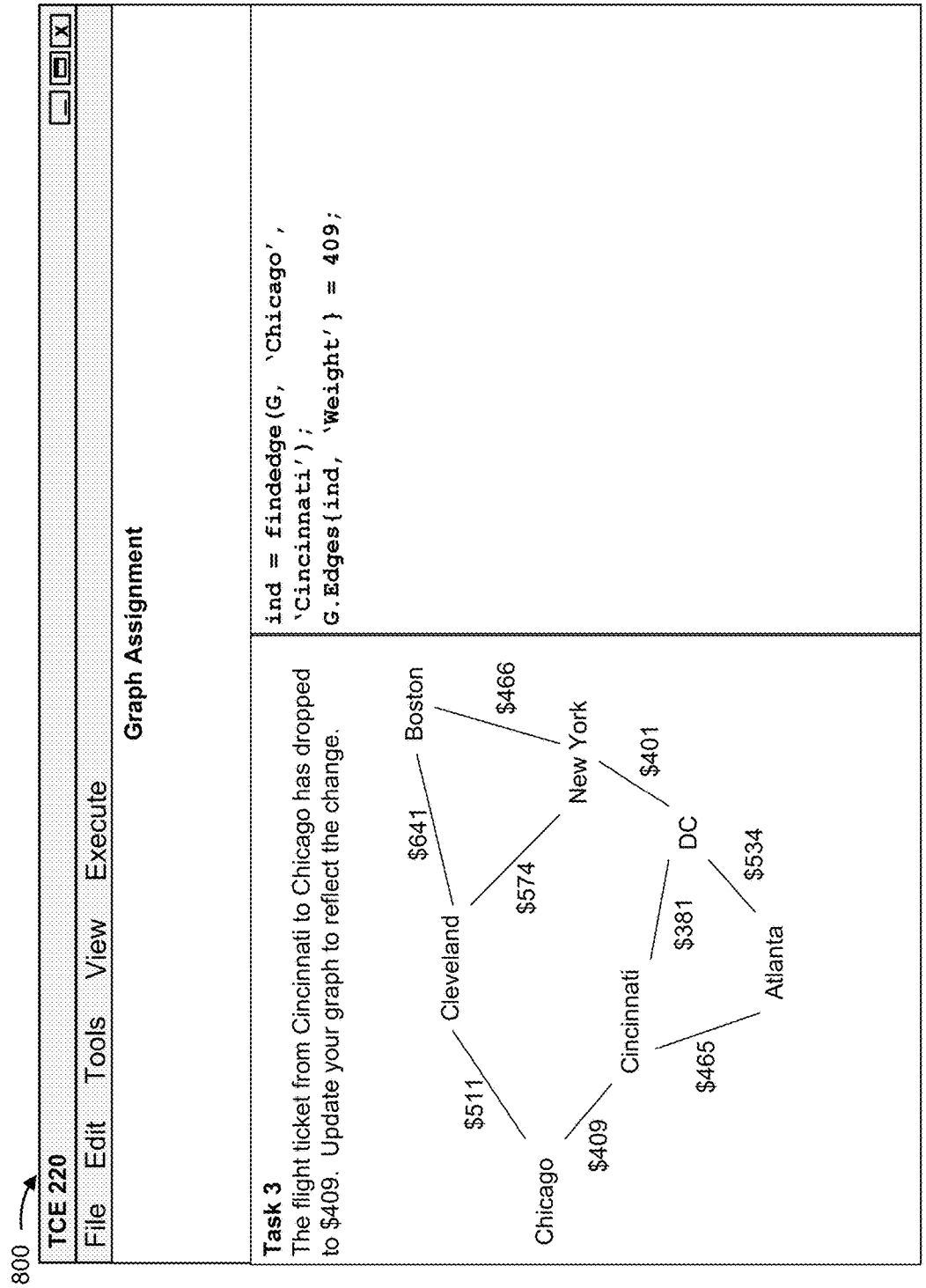

FIG. 8D

```
TCE 220
File  Edit  Tools  View  Execute
                                    Graph Assignment

[path, d] = shortestpathtree(G, 'Boston',
'Atlanta');
[path, d] = shortestpathtree(G, 'Boston');

Task 5
For this task, find out the answer to the following
questions:
- What's the cheapest route from Boston to Atlanta?
- What's the cheapest route from Boston to all other cities
  in the map?
```

Boston — $466 — New York
Boston — $641 — Cleveland
Cleveland — $574 — New York (approx)
New York — $401 — DC
DC — $381 — Cincinnati
DC — $534 — Atlanta
Cincinnati — $465 — Atlanta
Cincinnati — $409 — Chicago
Chicago — $511 — Cleveland

FIG. 8E

TCE 220

File  Edit  Tools  View  Execute

Graph Assignment

Task 6
For this task, create a new graph that represents the following map.

```
s = [1 1 2 2 3 3 4 5 6];
t = [2 6 3 6 4 5 5 7 7];
weights = [466, 641, 401, 574, 534, 381,
465, 409, 511];
names = {'Boston', 'New York', 'DC',
'Atlanta', 'Cincinnati', 'Cleveland',
'Chicago'};
G = digraph(s, t, weights, names);
```

Boston → $466 → New York
Boston → $641 → Cleveland
New York → $401 → DC
New York → $574 → Cleveland
DC → $381 → Cincinnati
DC → $534 → Atlanta
Atlanta → $465 → Cincinnati
Cincinnati → $409 → Chicago
Cleveland → $511 → Chicago

FIG. 8F

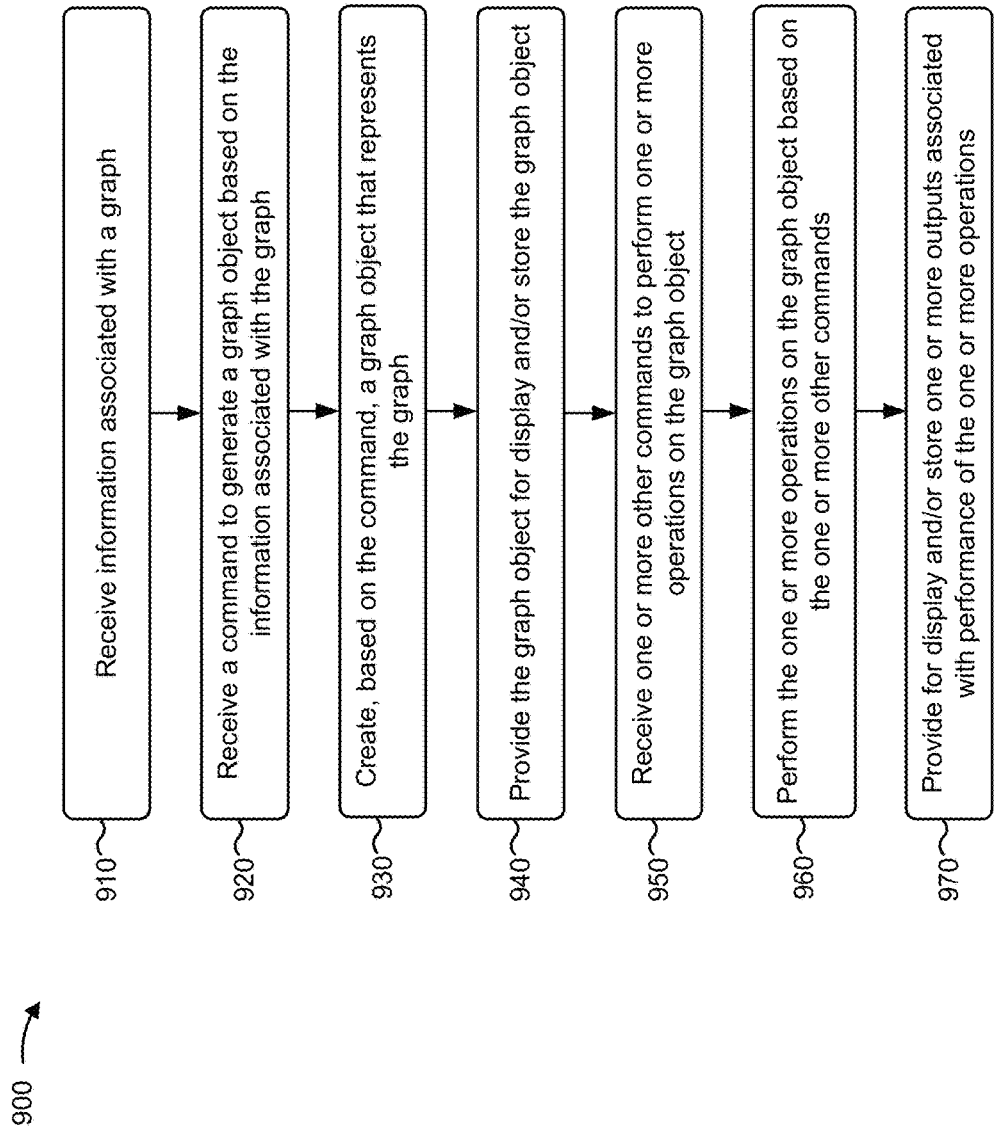

GRAPH CLASS APPLICATION PROGRAMMING INTERFACES (APIS)

BRIEF DESCRIPTION OF THE DRAWINGS

FIG. 4 is a diagram of an example implementation of utilizing graph class application programming interfaces (APIs) to represent a graph;

FIGS. 5A and 5B are diagrams of another example implementation of utilizing graph class APIs to represent a graph;

FIGS. 8A-8G are diagrams of another example implementation of utilizing graph class APIs to represent a graph; and FIG. 9 is a flow chart of an example process for utilizing graph class APIs to represent a graph.

DETAILED DESCRIPTION

Figure 1:
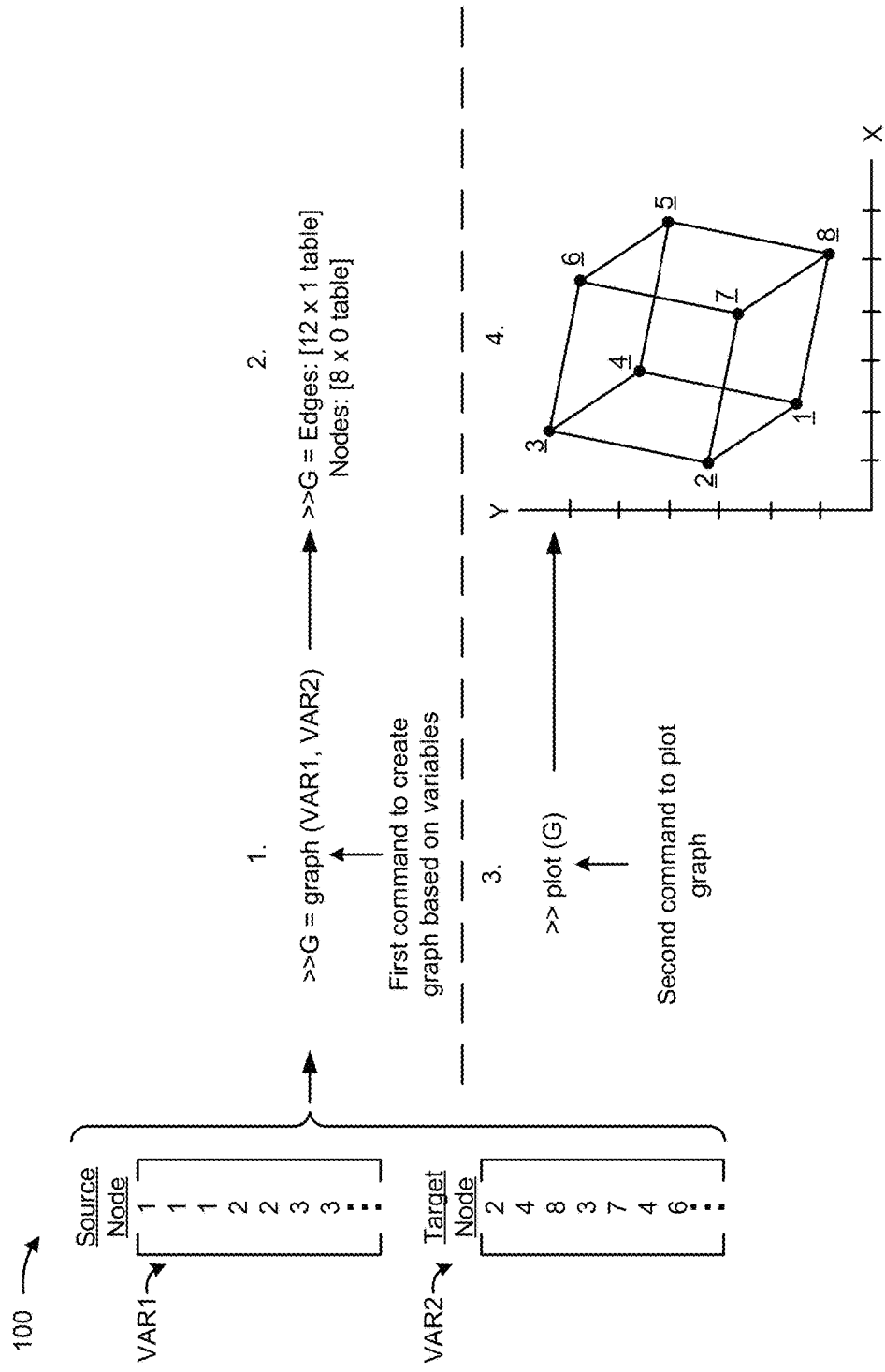
FIG. 1 is a diagram of an overview of an example implementation described herein.

The following detailed description of example implementations refers to the accompanying drawings. The same reference numbers in different drawings may identify the same or similar elements.

A device, such as a computer, may be used to receive or create code. For example, a particular device may be utilized to create code associated with representing a graph. A graph may refer to a set of nodes (e.g., vertices) connected by a set of edges. For example, a particular edge may connect a first node and a second node. In some instances, an edge may be associated with a directionality. For example, a particular edge of a graph may be associated with a source node (e.g., an initial node of a directed edge) and a target node (e.g., a final node of a directed edge). In this case, the graph may be termed a directed graph or a digraph. The graph may be associated with a set of properties. For example, when an edge represents an airplane route connecting two cities (e.g., nodes), the edge may be associated with a cost for flying on the airplane route (e.g., a Weight property of the edge). Similarly, a name of a city (e.g., a node) connected by the edge may be represented as a node name property of the node (e.g., "Boston," "New York," etc.).

Graphs may be utilized to represent complex information in different fields, such as for imaging processing, computer vision, bioinformatics, graphical modeling, Bayesian networks, dependency analysis, graph partitioning, or the like. Algorithms may be applied to graphs to perform computations relating to the different fields. For example, image segmentation may be performed based on utilizing a particular algorithm, such as a Max-Flow/Min-Cut algorithm, a minimum spanning tree algorithm, or the like. In this case, pixels of an image may be represented as nodes connected to neighboring pixels by edges, and the particular algorithm may be applied to perform image segmentation.

However, presentation of a graph to a user via a matrix may add unnecessary complexity in adapting graph algorithms to perform computations on information represented via the graph. Moreover, a matrix type of data may lack functionalities useful for performing graph computations. For example, a sparse matrix may require that row indices are sorted in each column, which may contradict a topological order of a graph represented by the sparse matrix. As another example, a sparse matrix may not permit duplicate row entries, which may prohibit modeling of multigraphs, and may not permit explicit zeros to be stored, which may prohibit utilizing edges of weight zero. Similarly, encapsulation of graph data via a list may cause computations associated with the graph data to be inefficient, thereby utilizing excessive processing resources, memory resources, or the like.

Implementations, described herein may provide a graph class or digraph class application programming interface (API). The graph class may encapsulate graph data as an adjacency matrix, and may compute and present the graph data as an edge list, a node list, a plotted graph, or the like. In this way, graph data is presented to users in a manner that permits intuitive utilization of graph algorithms without the user being required to understand the algorithm in terms of a matrix. Moreover, the graph data is represented in a matrix format that permits efficient computation of the graph algorithms and/or other computations performed on the graph data.

FIG. 1 is a diagram of an overview of an example implementation 100 described herein. Example implementation 100 may be performed by a device, such as a client device, a server device, or the like.

With reference to FIG. 1, the device may receive a first variable (e.g., VAR1) with a particular data type (e.g., a numeric data type) and a second variable (e.g., VAR2) with the particular data type. The first variable may include an array with one column (e.g., "Source Node") and a set of 12 rows. Assume that the first variable represents a set of source nodes for a graph. The second variable may include another array with one column (e.g., "Target Node") and a set of 12 rows. Assume that the second variable represents a set of target nodes for the graph. Assume that, in the 12 rows of the first variable and the 12 rows of the second variable, 8 different nodes are identified (e.g., rows 1, 2, and 3 of the first variable identify a first node (1), rows 4 and 5 of the first variable and row 1 of the second variable identify a second node (2), etc.). The column names of the first variable and the second variable may not be considered rows of the first variable and the second variable.

Although graph data may be described in terms of a graph or a digraph, or in terms of a graph class or a digraph class, these terms are to be understood interchangeably. Thus, the digraph class can be understood as a type of graph class that implements ordering for the source node and target node, with the ordering representing a directionality of an edge connecting the source node and target node. To the extent that a graph class graph is referred to as having a source node and a target node, the source node can be understood to refer to a first node and the target node can be understood to refer to a second node, with an edge connecting the first node and the second node not being associated with a directionality.

As further shown in FIG. 1, the device may receive a first command, such as G graph(VAR1, VAR2). In some implementations, the first command may include additional characters, fewer characters, different characters, or differently arranged characters. In some implementations, graph( ) may receive additional parameters, fewer parameters, different parameters, or differently arranged parameters. The first command may cause the client device to create a graph (G) from the first variable and the second variable. For example, the first command shown in FIG. 1 may create a particular graph that includes a set of edges Edges: [12×1 table] and a set of nodes Nodes: [8×0 table]. The first variable and the second variable may be collectively stored as a sparse matrix representing a graph. Properties of edges or nodes of the graph may be stored as a table of properties that can be associated with respective edges or nodes as needed. The set of nodes of the particular graph, G, correspond to the set of 8 nodes identified in VAR1 and VAR2, collectively. The set of edges of the particular graph, G, represent each of the 12 rows in VAR1 and in VAR2.

As further shown in FIG. 1, the device may receive a second command, such as plot(G). In some implementations, the second command may include additional characters, fewer characters, different characters, or differently arranged characters. In some implementations, plot( ) may receive additional parameters, fewer parameters, different parameters, or differently arranged parameters. The second command may cause the client device to generate a graphical representation of the particular graph. For example, the second command may cause the client device to generate a graphical representation of the set of 8 nodes and the set of 12 edges with reference to a set of axes (e.g., X and Y axes of a Cartesian plot).

Such an arrangement may provide simple and convenient APIs for creating and manipulating graphs and/or digraphs. The APIs may make writing code more intuitive and less time consuming for a user (e.g., a programmer, a software developer, etc.), which may enable the user to accomplish tasks more quickly and efficiently. The APIs may make graphs and/or digraphs useful to more people. The table APIs make it very easy for users to interact with data that is arranged in a graph format without having to manually construct or figure out how to perform operations on matrices. The APIs may make computation of graph data more efficient. For example, based on storing graph data as a set of edges represented in a sparse matrix, the client device may perform algorithmic computations on the graph data with reduced processing resources and memory resources relative to other data storage types.

Figure 2:
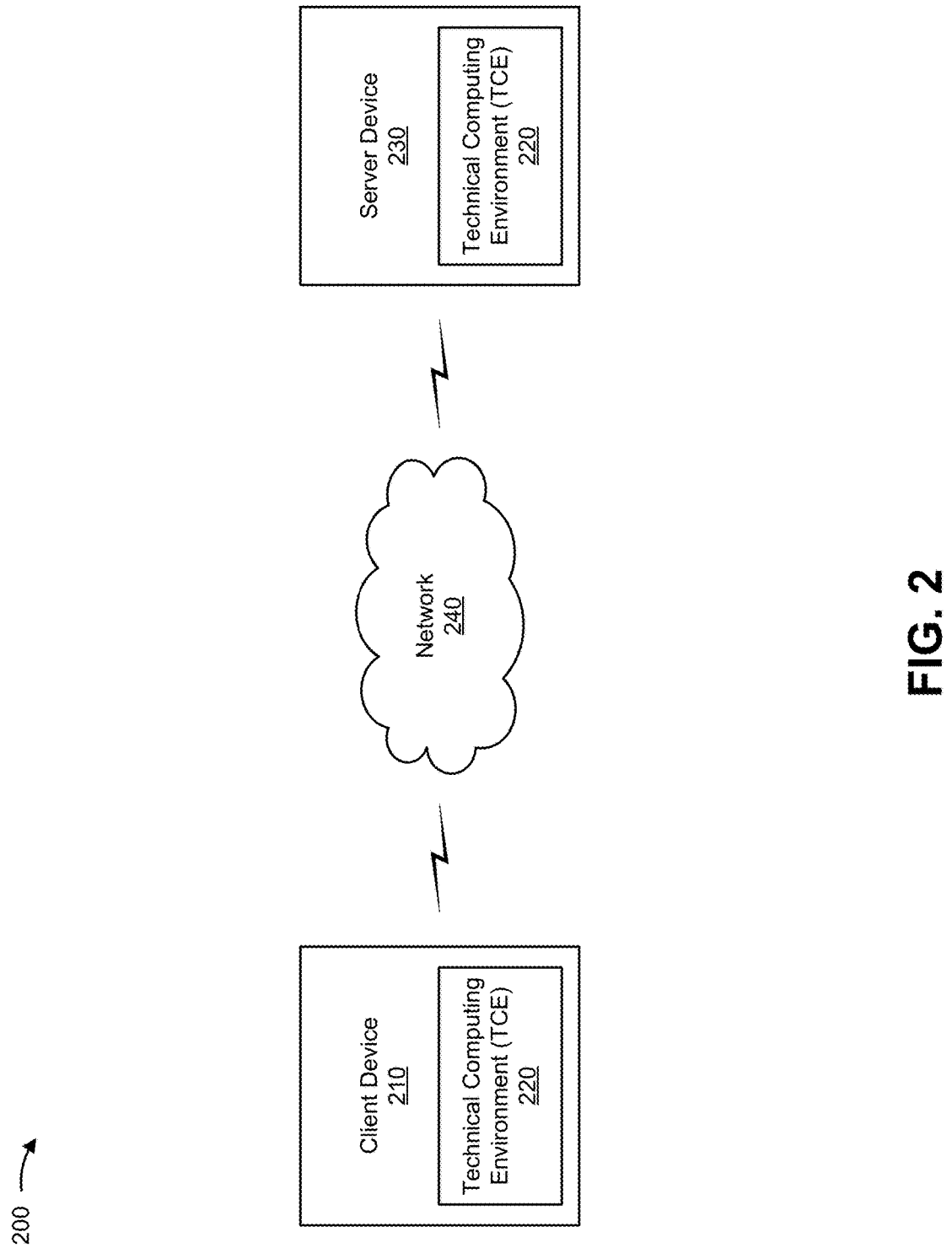
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, processing, and/or providing information, such as information associated with code. For example, client device 210 may include a computing device, such as a desktop computer, a laptop computer, a tablet computer, a mobile phone (e.g., a smart phone, a radiotelephone, etc.), or a similar device. In some implementations, client device 210 may receive information from and/or transmit information to server device 230.

Client device 210 may host TCE 220. Functions described herein as being performed by TCE 220 may be performed by client device 210 and execution of TCE 220 by client device 210. TCE 220 may include any hardware-based component or a combination of hardware and software-based components that provides a computing environment that enables performance of tasks related to disciplines, such as, but not limited to, mathematics, science, engineering, medicine, business, or the like, more efficiently than if the tasks were performed in another type of computing environment, such as an environment that required the device to develop code in a conventional programming language, such as C++, C, Fortran, Pascal, Python, or the like. TCE 220 may include a text-based environment (e.g., MATLAB software; Octave; NumPy; SciPy; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; or the like); a graphically-based environment (e.g., Simulink® software, Stateflow® software, SimEvents® software, Simscape™ software, or the like, by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; or the like); or another type of environment, such as a hybrid environment that includes one or more of the above-referenced text-based environments and one or more of the above-referenced graphically-based environments.

For example, TCE 220 may provide mathematical functions and/or graphical tools (e.g., for creating plots, surfaces, images, volumetric representations, or the like). In some implementations, TCE 220 may provide these functions and/or tools using toolboxes (e.g., toolboxes for signal processing, image processing, data plotting, parallel processing, or the like). In some implementations, TCE 220 may provide these functions as block sets or in another way, such as via a library, a local or remote database (e.g., a database operating in a computing cloud), remote procedure calls ("RPCs"), an application programming interface ("API"), or the like.

TCE 220 may include a modeling system that may be used in the creation of a functional model and that may enable generation of executable code based on the model. For example, TCE 220 may include a graphical modeling tool or application that provides a user interface for a numerical computing environment. Additionally, or alternatively, TCE 220 may include a graphical modeling tool and/or application that provides a user interface for modeling and simulating (e.g., by executing a model) a dynamic system (e.g., based on differential equations, difference equations, discrete events, discrete states, or the like). Execution of a model to simulate a system may also be referred to as simulating a model. The model may further include static relations (e.g., algebraic relations, stochastic relations, inequalities, or the like).

Server device 230 may include one or more devices capable of receiving, generating, storing, processing, and/or providing information, such as information associated with code. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution). Additionally, or alternatively, server device 230 may perform one, more, or all operations described elsewhere herein as being performed by client device 210.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
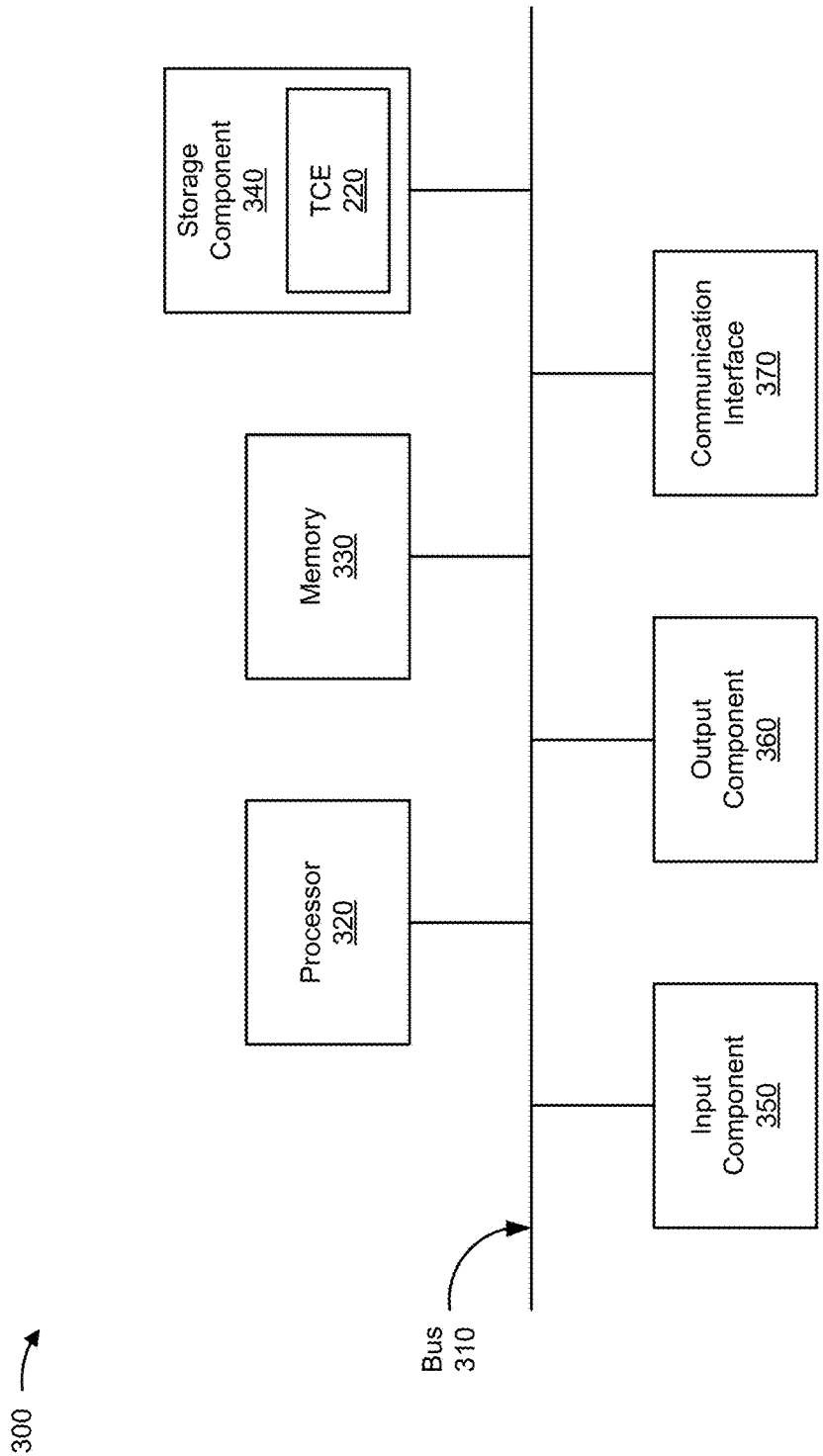
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a diagram of an example implementation 400 of utilizing graph class APIs to represent a graph. For example, FIG. 4 shows an example of adding nodes and edges to an empty graph.

As shown in FIG. 4, assume that client device 210 (e.g., TCE 220) provides a user interface for display to a user. As shown by reference number 410, client device 210 receives a first instruction to create a graph object (G) representing a graph. For example, the first instruction (e.g., G=graph;) causes client device 210 to create the graph object as an empty graph (e.g., a graph without any nodes or edges).

As further shown in FIG. 4, and by reference number 420, client device 210 receives a second instruction to add a set of edges to the graph object. For example, the second instruction (e.g., G=addedge(G,[1 2],[2 3]) causes client device 210 to add a set of nodes (e.g., 1, 2, and 3) and a set of edges (e.g., a first edge connecting 1 to 2 and a second edge connecting 2 to 3). The second instruction causes client device 210 to provide output indicating that the set of nodes and the set of edges are added to the graph object. For example, the second instruction causes client device 210 to identify a table of edges (e.g., a 2×1 table). As an example naming convention, the 2 indicates that there are two edges in the set of edges and the 1 indicates that there is one associated property for the two nodes (e.g., an EndNodes property identifying which nodes are ends of a particular edge). Further to the example, the second instruction causes client device 210 to identify a table of nodes (e.g., a 3×0 table). As an example naming convention, the 3 indicates that there are three nodes in the set of nodes and the 0 indicates that there are zero associated properties for the three nodes. The table of edges and the table of nodes may be generated to provide information to a user based on receiving an instruction from a user.

As further shown in FIG. 4, and by reference number 430, client device 210 receives a third instruction (e.g., G.Edges) to provide information identifying a list of edges included in the graph represented by the graph object. For example, the third instruction causes client device 210 to provide a list of edges identified by sets of nodes connected by respective edges of the list of edges (e.g., identifying a first edge connecting 1 and 2 and a second edge connecting 2 and 3).

As indicated above, FIG. 4 is provided merely as an example. Other examples are possible and may differ from what was described with regard to FIG. 4.

FIGS. 5A and 5B are diagrams of an example implementation 500 of utilizing graph class APIs to represent a graph. For example, FIGS. 5A and 5B show an example of creating a graph with node names based on an adjacency matrix.

As shown in FIG. 5A, client device 210 (e.g., TCE 220) provides a user interface with which to receive instructions. As shown by reference number 510, client device 210 receives a first set of instructions (e.g., A=foo(4); A(A>10) =0) to create an adjacency matrix. For example, the first set of instructions causes client device 210 to generate a 4×4 matrix with a particular set of values and to output a representation of the 4×4 matrix and the particular set of values.

As further shown in FIG. 5A, and by reference number 520, client device 210 receives a second set of instructions (e.g., names={'alpha' 'beta' 'gamma' 'delta'}; G=digraph (A, names, 'OmitSelfLoops')) that causes client device 210 to generate a digraph with named nodes based on the adjacency matrix. The 'OmitSelfLoops' input argument of digraph( ) causes client device 210 to omit entries on the diagonal of the adjacency matrix from the digraph. In this way, client device 210 avoids creating edges that connect a particular node to itself. Based on receiving the second set of instructions, client device 210 generates a digraph object (G) representing a digraph and provides information identifying properties of the digraph object (e.g., an 8×2 table indicating that there are 8 edges, each with an EndNodes property and a Weight property and a 4×1 table indicating that there are 4 nodes, each with a name property).

As shown in FIG. 5B, and by reference number 530, client device 210 receives a third set of instructions (e.g., G.Edges) that causes client device 210 to provide information regarding edges of the digraph represented by the digraph object. For example, client device 210 provides information identifying, for a first edge, a set of end nodes ('alpha' 'beta') and a weight (2). The set of end nodes correspond to the position of a particular indicator of an edge in the adjacency matrix, and the Weight property corresponds to a value of the particular indicator of the edge in the adjacency matrix. As another example, client device 210 provides information identifying, for a second edge, a set of end nodes ('alpha' 'gamma') and a weight (3). The properties of the edges may be stored via a separate data structure from information identifying the edges, such as via a list of properties, an array of properties, or the like.

As further shown in FIG. 5B, and by reference number 540, client device 210 receives a fourth set of instructions (e.g., G.Nodes) that causes client device 210 to provide information regarding nodes of the digraph represented by the digraph object. For example, client device 210 provides information identifying the name property for each node ('alpha' 'beta' 'gamma' 'delta'). In some implementations, client device 210 may store graph data regarding the edges, and may generate graph data regarding the nodes based on receiving a request for information regarding the nodes. In this case, client device 210 may store properties associated with the nodes (e.g., node names) via a separate data structure from the graph data regarding the edges, such as via a list of properties, an array of properties, or the like. Client device 210 may reduce processing resource utilization by providing the names of the nodes from an array of node names rather than generating graph data regarding the nodes based on the graph data regarding the edges.

As indicated above, FIGS. 5A and 5B are provided merely as an example. Other examples are possible and may differ from what was described with regard to FIGS. 5A and 5B.

Figure 6:
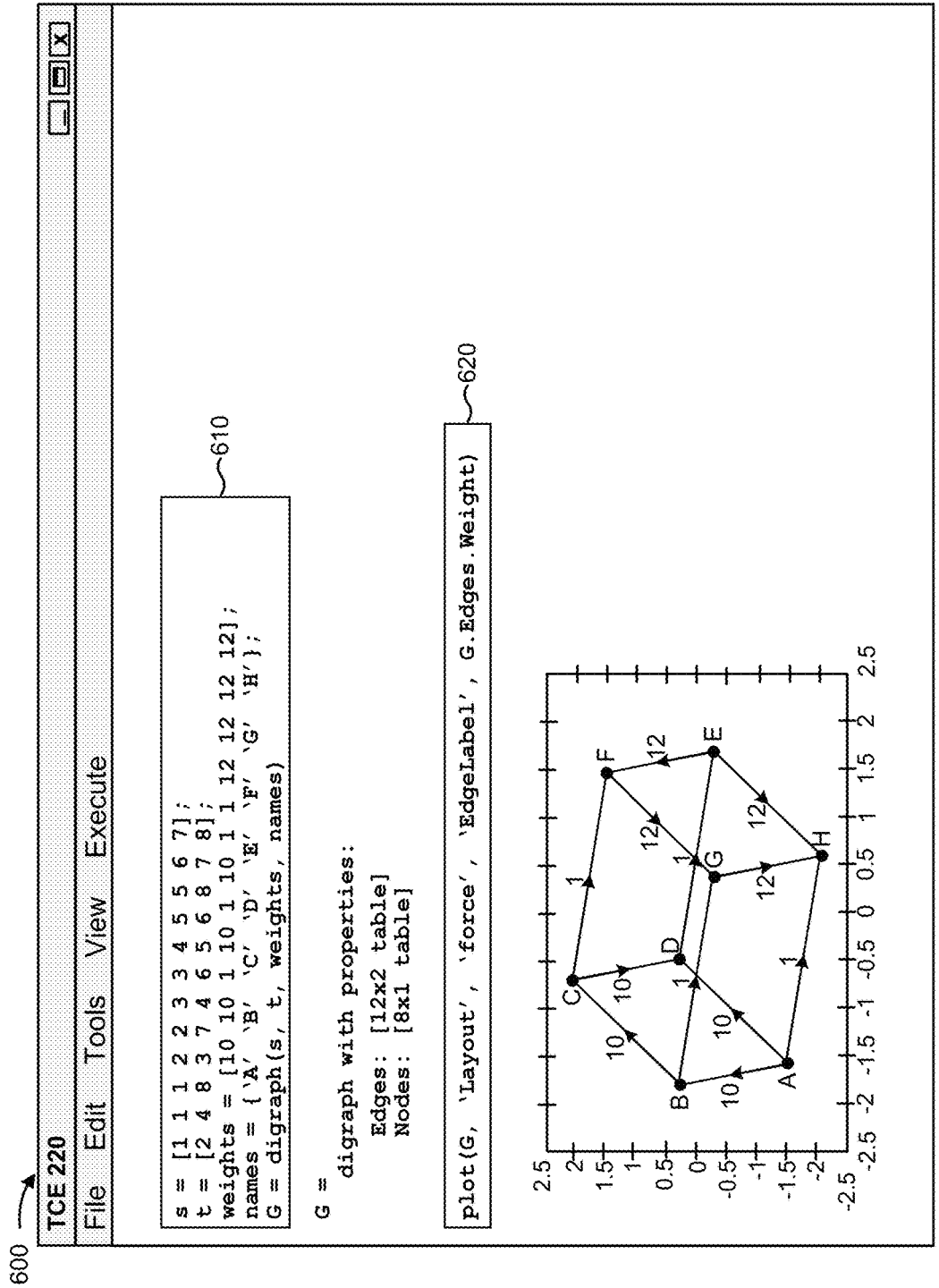
FIG. 6 is a diagram of another example implementation of utilizing graph class APIs to represent a graph.

FIG. 6 is a diagram of an example implementation 600 of utilizing graph class APIs to represent a graph. For example, FIG. 6 shows an example of constructing a digraph object based on a list of end nodes.

As shown in FIG. 6, client device 210 (e.g., TCE 220) may provide a user interface with which to receive instructions. As shown by reference number 610, client device 210 receives a set of instructions associated with generating a digraph object (G) representing a digraph. For example, client device 210 receives information associated with creating a set of source nodes (s), a set of target nodes (t), a set of edge weights (weights), and a set of node names (names). Further to the example, client device 210 receives a particular instruction, of the first set of instructions, with a set of input arguments corresponding to the set of source nodes, the set of target nodes, the set of edge weights, and the set of node names (e.g., G digraph(s,t,weights,names)). This causes client device 210 to generate the digraph object, provide output associated with describing parameters of the digraph object (e.g., a 12×2 table indicating that there are 12 edges with an EndNodes property and a Weight property and an 8×1 table indicating that there are 8 nodes with a name property).

As further shown in FIG. 6, and by reference number 620, client device 210 receives another instruction (e.g., plot(G, 'Layout', 'force', 'EdgeLabel', G.Edges. Weight)). Assume that the 'Layout', 'force', 'EdgeLabel', and G.Edges. Weight input arguments of the other instruction relate to configuring a graphical presentation of the digraph object, such as causing edge weights to be displayed adjacent to edges. For example, client device 210 provides, for display, a presentation of a digraph represented by the digraph object as a cube with nodes represented as vertices of the cube and with edges represented as edges of the cube.

As indicated above, FIG. 6 is provided merely as an example. Other examples are possible and may differ from what was described with regard to FIG. 6.

Figure 7:
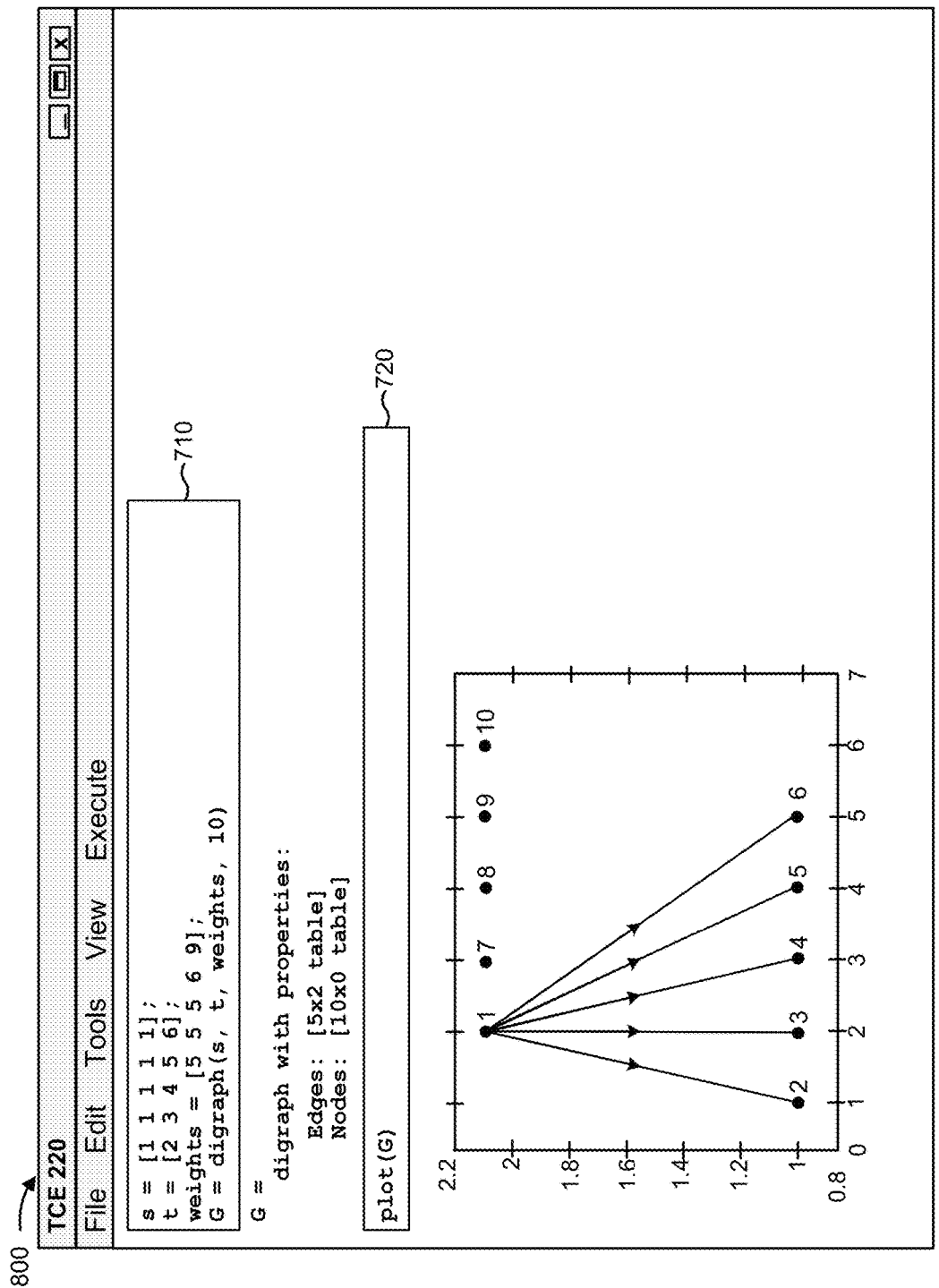
FIG. 7 is a diagram of another example implementation of utilizing graph class APIs to represent a graph.

FIG. 7 is a diagram of an example implementation 700 of utilizing graph class APIs to represent a graph. For example, FIG. 7 is an example of creating a weighted graph with a subset of nodes not connected by any edge.

As shown in FIG. 7, client device 210 (e.g., TCE 220) provides a user interface with which to receive instructions. As shown by reference number 710, client device 210 receives a first set of instructions associated with generating a digraph object (G) representing a digraph. For example, client device 210 receives information associated with creating a set of source nodes (s), a set of target nodes (t), and a set of weights (weights). Based on receiving a particular instruction, of the first set of instructions, with the set of source nodes, the set of target nodes, the set of weights, and a quantity of nodes (10) as input arguments (e.g., G=digraph (s,t,weights,10)), client device 210 generates the digraph object. Based on receiving the particular instruction, client device 210 provides information identifying properties of the digraph object (e.g., a 5×2 table indicating 5 edges with an EndNodes property and a Weight property and a 10×0 table indicating 10 nodes with 0 properties). Based on the set of source nodes and the set of target nodes only identifying 6 different nodes for connection via the set of edges, client device 210 includes information identifying a set of unconnected nodes in the graph data.

As further shown in FIG. 7, and by reference number 720, client device 210 receives a second set of instructions (e.g., plot(G)) that causes client device 210 to provide a graphical representation of the digraph represented by the digraph object. For example, client device 210 provides a plot of the digraph. The plot includes the nodes and edges defined by s and t, as well as a set of 4 unconnected nodes (e.g., nodes 7, 8, 9, and 10).

As indicated above, FIG. 7 is provided merely as an example. Other examples are possible and may differ from what was described with regard to FIG. 7.

FIGS. 8A-8G are diagrams of an example implementation 800 of utilizing graph class APIs to represent a graph. For example, FIGS. 8A-8G are an example of utilizing a graph class object in an educational context.

As shown in FIG. 8A, client device 210 (e.g., TCE 220) provides a user interface with which to receive instructions. The user interface includes an assignment portion (e.g., "Task 1") that identifies a first assignment for which a user is to generate code. For example, the user is instructed to generate a graph object to represent a coverage map for an airline. In this case, the coverage map identifies cities to which the airline flies (e.g., nodes), routes connecting cities (e.g., edges), and prices for the routes (e.g., weights). The user interface includes an input portion with which to receive code associated with the first assignment. For example, client device 210 receives a first instruction associated with creating an empty graph object (e.g., G=graph;), a second instruction associated with adding a first edge and associated nodes to the graph object (e.g., G=addedge(G, 'Boston', 'New York', 466), a third instruction associated with adding a second edge and associated nodes to the graph object (e.g., G=addedge(G, 'Boston', 'Cleveland', 641), or the like.

Figure 8B:
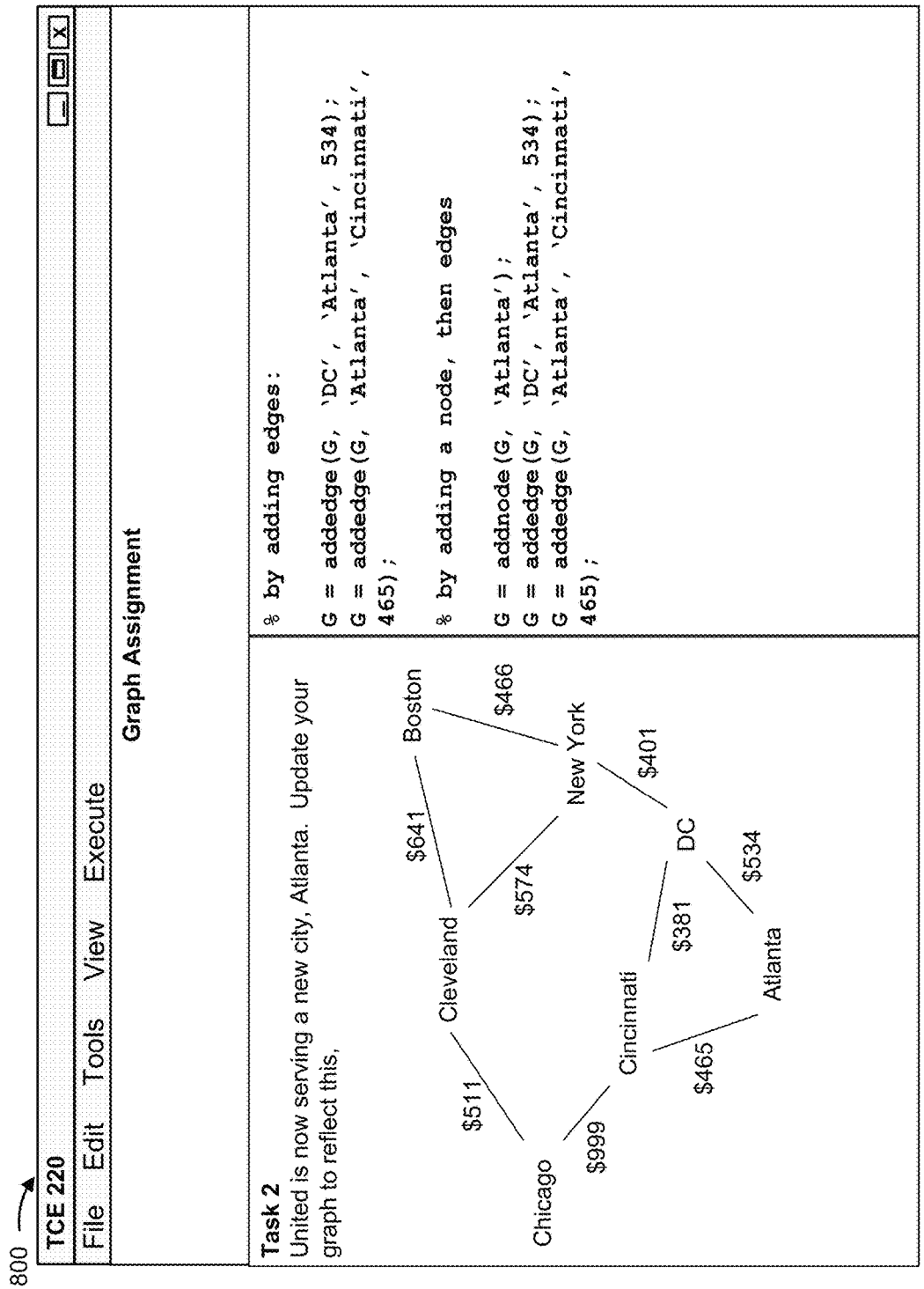

As shown in FIG. 8B, the user interface includes an assignment portion (e.g., "Task 2") that identifies a second assignment for which the user is to generate code. For example, the user is instructed to update the graph object to reflect a new city and a new set of routes added to the coverage map. The user interface includes an input portion with which to receive code associated with the second assignment. For example, client device 210 receives a first set of instructions identifying a first solution to the second assignment (e.g., "% by adding edges:" etc.) and a second set of instructions identifying a second solution to the second assignment (e.g., "% by adding a node, then edges" etc.).

As shown in FIG. 8C, the user interface includes an assignment portion (e.g., "Task 3") that identifies a third assignment for which the user is to generate code. For example, the user is instructed to change a price associated with a particular route (e.g., alter an edge weight for a particular edge). The user interface includes an input portion with which to receive code associated with the third assignment. For example, client device 210 receives a first instruction (e.g., ind=findedge(G, 'Chicago', 'Cincinnati');) that causes client device 210 to identify the particular edge of G corresponding to a route connecting Chicago and Cincinnati and save a reference to the edge as ind. Further to the example, client device 210 receives a second instruction (e.g., G.Edges{ind, 'Weight'}=409;) that causes client device 210 to change the Weight property of the edge in G referenced by ind to 409.

Figure 8D:
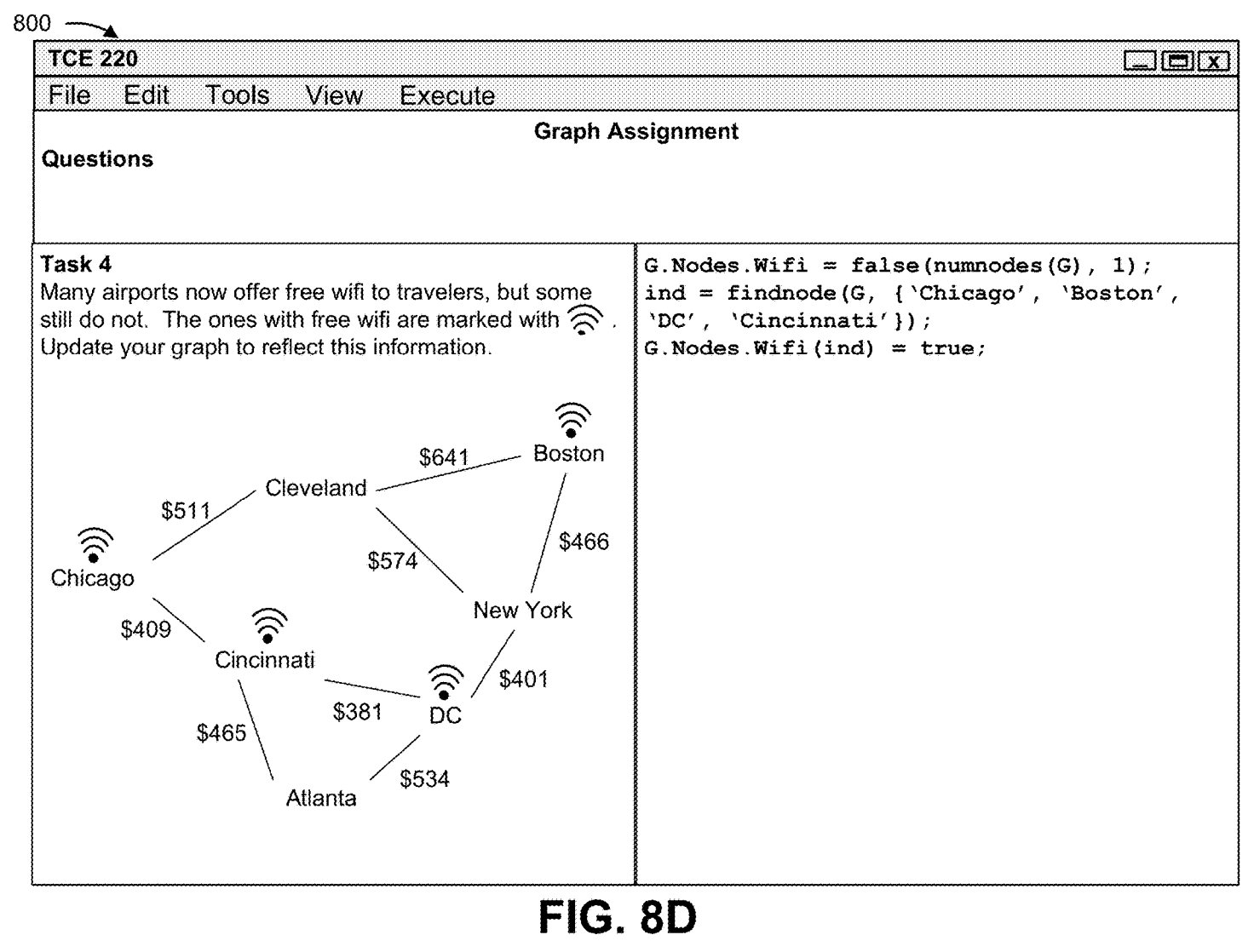

As shown in FIG. 8D, the user interface includes an assignment portion (e.g., "Task 4") that identifies a fourth assignment for which the user is to generate code. For example, the user is instructed to add information to the graph to identify cities at which a corresponding airport provides Wi-Fi. The user interface includes an input portion with which to receive code associated with the fourth assignment. For example, client device 210 receives a first instruction (e.g., G.Nodes.Wifi=false(numnodes(G), 1);) that causes client device 210 to create a new property for nodes of G (e.g., Wifi) and set the property to false for all nodes of G. Further to the example, client device 210 receives a second instruction (e.g., Ind=findnode(G, {'Chicago', 'Boston', 'DC', 'Cincinnati'});) that causes client device 210 to identify a set of nodes and store a reference to the set of nodes as Ind. Further to the example, client device 210 receives a third instruction (e.g., G.Nodes.Wifi(Ind)=true;) that causes client device 210 to set the Wifi property to true for the set of nodes referenced by Ind.

As shown in FIG. 8E, the user interface includes an assignment portion (e.g., "Task 5") that identifies a fifth assignment for which the user is to generate code. For example, the user is instructed to identify the cheapest route from a first node to a second node (e.g., a route with the least cost) and a set of cheapest routes from the first node to each other node of the graph. The user interface includes an input portion with which to receive code associated with the fifth assignment. For example, client device 210 receives a first instruction (e.g., [path, d]=shortestpathtree(G, 'Boston', 'Atlanta');) that causes client device 210 to store information identifying the cheapest route from Boston to Atlanta as a set of edges [d, path]. Further to the example, client device 210 receives a second instruction (e.g., [path, d]=shortestpathtree(G, 'Boston');) that causes client device 210 to store information identifying a set of cheapest routes from Boston to each other node of G as a group of sets of edges [path, d].

As shown in FIG. 8F, the user interface includes an assignment portion (e.g., "Task 6") that identifies a sixth assignment for which the user is to generate code. For example, the user is instructed to generate a new graph that represents a new route map with each route being in a single direction rather than being bidirectional. The user interface includes an input portion with which to receive code associated with the sixth assignment. For example, client device 210 receives input identifying a set of source nodes (s) (e.g., initial cities of each route), a set of target nodes (t) (e.g., final cities of each route), a set of weights (weights) (e.g., costs of each route), and a set of names (names) (e.g., city names for each node identified in s and t). Further to the example, client device 210 receives an instruction (e.g., G=digraph(s, t, weights, names);) that causes client device 210 to generate a digraph representing the new route map with input arguments including the set of source nodes, the set of target nodes, the set of weights, and the set of names.

Figure 8G:
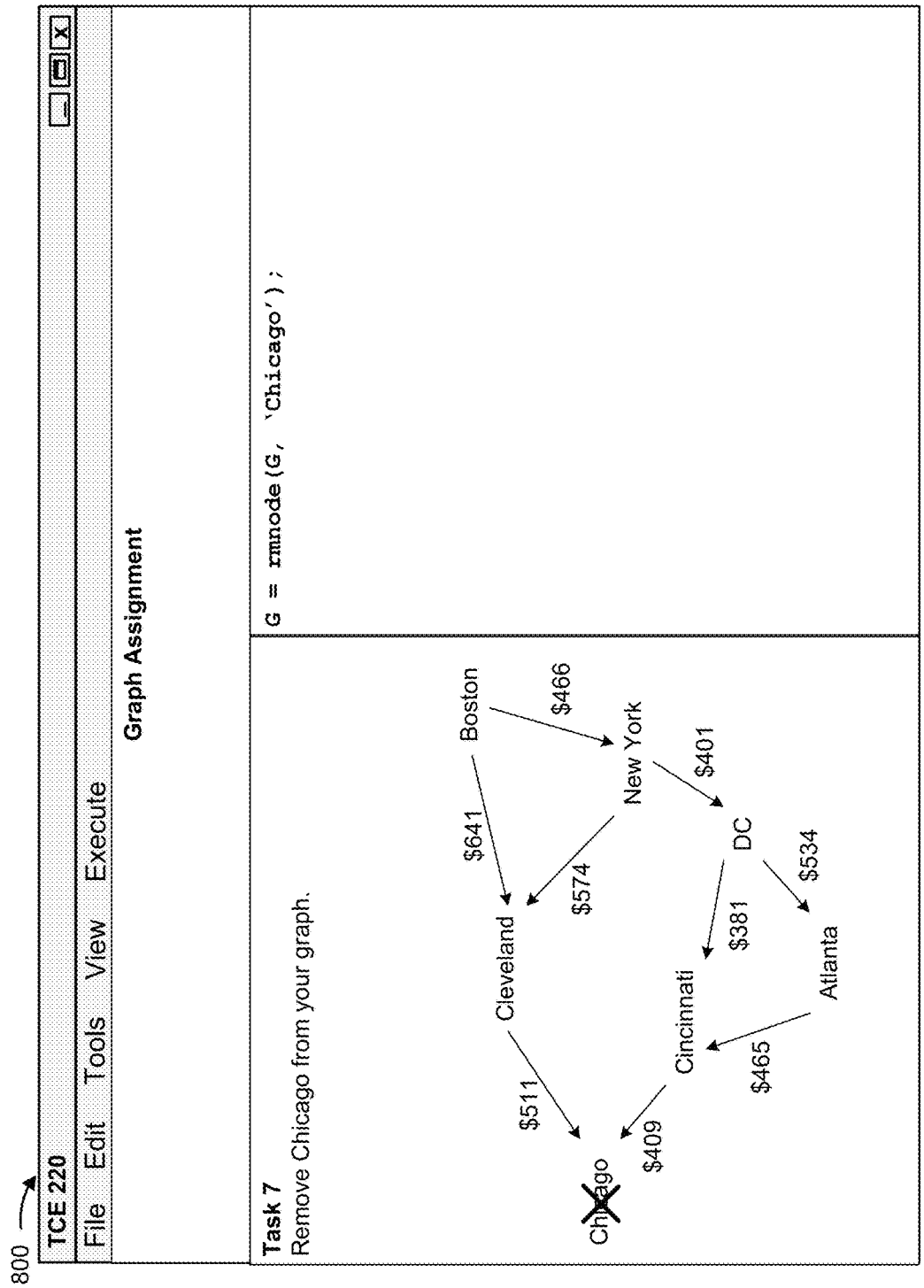

As shown in FIG. 8G, the user interface includes an assignment portion (e.g., "Task 7") that identifies a seventh assignment for which the user is to generate code. For example, the user is instructed to update the digraph to represent removal of a particular city from the new route map. The user interface includes an input portion with which to receive code associated with the seventh assignment. For example, client device 210 receives an instruction (e.g., G=rmnode(G, 'Chicago');) that causes client device 210 to identify one or more edges of G connecting to a node called Chicago and remove the one or more edges.

As indicated above, FIGS. 8A-8G are provided merely as an example. Other examples are possible and may differ from what was described with regard to FIGS. 8A-8G.

FIG. 9 is a flow chart of an example process 900 for utilizing graph class APIs to represent a graph. In some implementations, one or more process blocks of FIG. 9 may be performed by client device 210. In some implementations, one or more process blocks of FIG. 9 may be performed by another device or a group of devices separate from or including client device 210, such as server device 230.

As shown in FIG. 9, process 900 may include receiving information associated with a graph (block 910). For example, client device 210 may receive code. In some implementations, client device 210 may receive the code from a storage device. In some implementations, client device 210 (e.g., TCE 220) may receive the code based on a user creating the code. For example, a user may cause client device 210 to create or open a user interface. One or more lines of code may be added to the user interface to create the code. For example, client device 210 may receive an instruction, from the user, that indicates that a line of code is to be added to the user interface. Client device 210 may receive the instruction based on, for example, detecting a selection of a particular menu item, entry of a particular textual, audible, or visual input from the user, and/or entry of some other input that indicates a desire to add a line of code to the user interface.

In some implementations, the received code may include program code identifying a set of parameters of the graph. For example, the received code may include information identifying nodes of the graph, edges of the graph, a quantity of nodes of the graph, a quantity of edges of the graph, or the like, as shown in FIG. 6 with regard to reference number 610. Additionally, or alternatively, the received code may include information identifying a property, such as a node name, an edge weight, an edge direction, or the like. In some implementations, the received code may include code associated with a data structure from which to generate the graph object. For example, the received code may include information identifying a matrix (e.g., a particular matrix which includes one or more values corresponding to a node or an edge), a table (e.g., a table including one or more values associated with a node, an edge, etc.), an array, a list, or the like.

As further shown in FIG. 9, process 900 may include receiving a command to generate a graph object based on the information associated with the graph (block 920). For example, client device 210 may receive a command to generate the graph object. In some implementations, client device 210 (e.g., TCE 220) may receive the command based on a user creating the command. For example, a user may cause client device 210 to create or open a user interface, and the user may add the command to the user interface. In some implementations, client device 210 may receive an instruction, from the user, that indicates that the command is to be added to the user interface. Client device 210 may receive the instruction based on, for example, detecting a selection of a particular menu item, entry of a particular textual, audible, or visual input from the user, and/or entry of some other predetermined input that indicates a desire to add the command to the user interface. For example, as shown with regard to FIG. 4, client device 210 may receive keyboard input that causes client device 210 to receive program code for execution, such as a command, G=graph; that causes client device 210 to generate a graph object.

In some implementations, the command may include a graph class command that causes client device 210 to generate the graph object. Additionally, or alternatively, the graph class command may be a digraph class command that causes client device 210 to generate a digraph object as the graph object. For example, client device 210 may receive a graph class command including information identifying an adjacency matrix, an edge list, an edges table and/or a nodes table, one or more properties associated with an edge or a node, or the like, and may be caused to construct the graph object. In some implementations, a graph class command may include syntax of a general form graph(A), where graph may correspond to the graph class command and A may correspond to a square adjacency matrix for which the location of each nonzero entry in A specifies an edge of the graph. In some implementations, the graph class command may include additional characters, different characters, or differently arranged characters. In some implementations, the user of client device 210 may specify a different syntax for the graph class command.

In some implementations, the graph class command may be called without an input argument. For example, client device 210 may receive a digraph class command G=digraph, which causes client device 210 to generate an empty directed graph object, G (e.g., a digraph which includes zero nodes and zero edges). In some implementations, the graph class command may be called with a set of input arguments. For example, client device 210 may receive a graph class command of the form G=graph (ARGS), which may cause client device 210 to generate a graph object, G, based on a set of input arguments, ARGS. In some implementations, the set of input arguments may include information associated with identifying one or more edges or nodes of a graph object. For example, the set of input arguments may include an input argument specifying a matrix storing values identifying nodes or edges, a set of source nodes, a set of target nodes, a list of edges, a list of nodes, a quantity of nodes, a set of edges, or the like. Additionally or alternatively, the set of input arguments may include an input argument specifying a property of a set of nodes or edges, such as an input argument specifying a set of edge weights, a set of node names, or the like. Additionally, or alternatively, the set of parameters may include an instruction associated with generating a set of nodes or edges based on another input argument. For example, a first input argument may specify a matrix from which to construct a set of edges and a set of nodes and a second input argument may include an instruction to omit self-loop nodes of the matrix (e.g., a node for which a source node and a target node are a common node).

As further shown in FIG. 9, process 900 may include creating, based on the command, a graph object that represents the graph (block 930). For example, based on the command and the information associated with the graph, client device 210 may create a graph class object that represents the graph. In some implementations, the command may cause client device 210 to generate a data structure with a particular data type to encapsulate information identifying a set of nodes, a set of edges, or the like when generating the graph object. For example, client device 210 may generate a sparse matrix that stores graph data relating to edges of the graph (e.g., a set of edge indices representing the set of edges). In this case, columns of the sparse matrix and rows of the sparse matrix (e.g., position of an edge index in the sparse matrix) may indicate nodes connected by an edge identified by the edge index. Additionally, or alternatively, client device 210 may generate an object that includes a portion of a sparse matrix. For example, client device 210 may generate a C++ type of object that includes information identifying a compressed sparse row associated with a sparse matrix, a C++ type of object storing information associated with identifying a sparse matrix, or the like.

In some implementations, the command may cause client device 210 to generate another data structure with another data type to encapsulate information regarding the set of nodes, the set of edges, or the like when generating the graph object. For example, client device 210 may generate a table of properties for edges of the graph, such as a list of edge weights or the like. In this case, a column of the table may represent a particular property of an edge and client device 210 may generate additional columns to represent additional properties that are added to edges of the graph. Similarly, client device 210 may generate a table of properties for nodes of the graph, such as a list of node names or the like.

In some implementations, the command may cause client device 210 to generate a graph object that includes an unconnected node. For example, client device 210 may generate a sparse matrix associated with a particular quantity of rows and columns corresponding to the quantity of nodes, and may include one or more rows or columns for which an edge index is not included, thereby indicating that the node is unconnected. In some implementations, the command may cause client device 210 to generate a graph object that includes an edge with a weight of zero. For example, client device 210 may generate a table of edge weights and may include an edge weight of zero in the table of edge weights. In this case, when providing information regarding the set of edges, client device 210 may determine an edge index of a sparse matrix that includes a value corresponding to an entry of the table of edge weights (e.g., corresponding to the edge weight of zero in the table of edge weights), and may provide information indicating that the edge identified by the edge index is associated with an edge weight of zero. In this way, client device 210 may utilize sparse matrix values to identify zero edge weights, despite a zero of a sparse matrix corresponding to an unconnected node. Moreover, when providing output identifying the sparse matrix, client device 210 may replace values pointing to entries of the table of edge weights with the entries of the table of edge weights, thereby providing information identifying edge weights in a matrix representation of the graph represented by the graph object.

As further shown in FIG. 9, process 900 may include providing the graph object for display and/or storing the graph object (block 940). For example, client device 210 may provide the graph object for display and/or may store the graph object. In some implementations, client device 210 may store the graph object (e.g., a table of edge properties, a table of node properties, and a sparse matrix of edge indices) in a memory associated with client device 210. For example, client device 210 may store the graph object in a memory, store a reference to the graph object in a memory, or the like.

In some implementations, client device 210 may display a representation of the graph object in a user interface. For example, client device 210 may display a textual representation of the graph object in the user interface. In some implementations, the textual representation may be a different representation than a representation of the graph object in memory. For example, when client device 210 stores the graph object in memory as a table of edge properties, a table of node properties, and a sparse matrix of edge indices, client device 210 may provide a textual representation of a table of edges and/or a table of nodes. In this way, client device 210 may utilize a sparse matrix of edge indices for efficient computation of graph data and may provide a table of edges and/or a table of nodes for an intuitive display of the graph data.

In some implementations, client device 210 may display a graphical representation of the graph object, such as a plot of nodes and edges (e.g., based on a graph plotting technique). For example, client device 210 may plot nodes and edges based on the sparse matrix of edge indices, and may include information identifying one or more properties associated with the graph object in the plot, such as representing edge weights, node names, or the like textually in the plot. Additionally, or alternatively, client device 210 may provide an indication of a property of a node or edge via a color of text or a line in the graphical representation of the graph object, a size of text or a line included in the graphical representation of the graph object, a style of text or a line included in the graphical representation of the graph object, an icon, or the like. In this way, client device 210 presents a graphical depiction of the graph represented by the graph object, thereby permitting a user to view the graph in a topological format rather than in a confusing matrix format.

As further shown in FIG. 9, process 900 may include receiving one or more other commands to perform one or more operations on the graph object (block 950). For example, client device 210 may receive one or more other commands to perform one or more operations on the graph object. In some implementations, client device 210 (e.g., TCE 220) may receive the other command(s) based on a user creating the other command(s). For example, a user may cause client device 210 to create or open a user interface, and the user may add the other command(s) to the user interface. In some implementations, client device 210 may receive an instruction, from the user, that indicates that the other command(s) are to be added to the user interface. Client device 210 may receive the instruction based on, for example, detecting a selection of a particular menu item, entry of a particular textual, audible, or visual input from the user, and/or entry of some other predetermined input that indicates a desire to add the other command(s) to the user interface.

In some implementations, the other command(s) may include graph class commands that perform modification operations (e.g., addedge, rmnode, or the like); inspection operations (e.g., findedge, numnodes, or the like); search operations (e.g., bfsearch for breadth-first search, dfsearch for depth-first search, conncomp for identifying connected components, minspantree for identifying a minimum spanning tree, or the like); path operations (e.g., shortestpath for a shortest path of edges between nodes, distances for a distance between nodes, or the like); matrix representation operations (e.g., adjacency, incidence, laplacian, or the like for respective matrices associated with the graph); node information operations (e.g., degree, neighbors, or the like for respective information regarding a node); visualization operation (e.g., plot or the like). Additionally, or alternatively, the other command(s) may include graph class command(s) relating to altering a plot (e.g., a visualization alteration operation), such as command(s) relating to graph edges (e.g., ArrowSize, EdgeColor, LineWidth, or the like); graph nodes (e.g., Marker, NodeColor, XData, YData, or the like); visibility (e.g., Visible or the like); or the like.

As further shown in FIG. 9, process 900 may include performing the one or more operations on the graph object based on the one or more other commands (block 960). For example, client device 210 may perform one or more operations on the graph object based on the one or more other commands. In some implementations, client device 210 may alter the graph object based on the one or more other commands. For example, when client device 210 receives a rmnode command in relation to a particular node, as shown in FIG. 8G, client device 210 may alter a sparse matrix encapsulating edge indices for the graph object to remove edge indices associated with connecting one or more nodes that connect to the particular node. In some implementations, a particular node may connect to the particular node (e.g., a self-loop). Similarly, when client device 210 receives an addedge command in relation to a first node and a second node, as shown in FIG. 8A, client device 210 may alter a sparse matrix encapsulating edge indices for the graph object to add another edge index that represents an edge connecting the first node and the second node. In this way, client device 210 efficiently alters edges and/or nodes of a graph object by altering a sparse matrix storing edge indices representing edges connecting nodes.

In some implementations, client device 210 may alter a set of properties of a graph object based on the one or more other commands. For example, when client device 210 receives a Nodes command in relation to a new property for a set of nodes of a graph, as shown in FIG. 8D, client device 210 may alter a table of node properties of the graph object to include a new column associated with representing the new property for the set of nodes. In some implementations, client device 210 may generate a new graph object to alter a graph object. For example, client device 210 may generate a new graph object with a different set of properties from a graph object to alter the graph object. In this way, client device 210 efficiently alters properties of edges and/or nodes of a graph object by altering a table storing the properties of the edges and/or the nodes or generating a new table.

In some implementations, client device 210 may perform a scalar expansion to modify the graph object based on the one or more other commands. For example, when client device 210 receives a command that includes a vector portion and a scalar portion (e.g., g=graph (1, 2:5)), client device 210 may cause the scalar portion to be expanded to correspond to the vector portion, thereby permitting the command to be executed (e.g., thereby causing client device 210 to generate a graph, g, with a first node, 1, connected to a second node, 2, a third node, 3, a fourth node, 4, and a fifth node, 5). In some implementations, client device 210 may alter the graph object by generating a different graph object.

For example, when client device 210 generates the graph object as a value based graph object and receives a first command h=g (where g is a graph object) and a second command g.addedge, client device 210 may cause an edge to be added to a first graph object g without an alteration to a second graph object h. In this case, client device 210 may cause create the second graph object when the second command is received, when the first command is received, or the like. In this way, client device 210 may improve utilization of algorithms with the graph object by preventing an algorithm to which a graph object is passed from modifying the graph object. Additionally, or alternatively, client device 210 may alter a single graph object referenced by multiple identifiers. For example, when client device 210 generates the graph object as a handle based graph object and receives a first command h=g (where g is a graph object) and a second command g.addedge, client device 210 may cause an edge to be added to a graph object that is referenced by both g and h (e.g., h and g each reference an underlying graph object that includes the added edge). In this way, client device 210 may permit a user to specify multiple identifiers for the same underlying graph object.

As further shown in FIG. 9, process 900 may include providing for display and/or storing one or more outputs associated with performance of the one or more operations (block 970). For example, client device 210 may provide output(s) associated with performance of the operation(s) for display and/or may store the output(s). In some implementations, client device 210 may store the output(s) in a memory (e.g., memory 330 and/or storage component 340 of FIG. 3) associated with client device 210. In some implementations, client device 210 may display the output(s) in a user interface that includes the one or more other commands. In some implementations, client device 210 may provide the user interface with the output(s) to one or more other devices.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include zero or more items (e.g., related items, unrelated items, a combination of related and unrelated items, etc.), and may be used interchangeably with "zero or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving a command to generate a graph object associated with a graph,
        the receiving the command being performed by a device;
    creating, based on receiving the command, the graph object,
        the graph object representing the graph,
        where creating the graph object includes creating a data structure, included in the graph object, that indicates a set of edge indices,
        the set of edge indices identifying a set of edges of the graph, the set of edges connecting a set of nodes of the graph,
        where creating the graph object includes creating a first table, included in the graph object, of a set of edge properties for the set of edges,
        where creating the graph object includes creating a second table, included in the graph object, of a set of node properties for the set of nodes, and
        the creating the graph object being performed by the device;
    generating a textual representation of the graph object that is different than a representation of the graph object stored in memory,
        the textual representation of the graph object being separate from a graphical representation of the graph object and indicating at least one of:
        a quantity of all edges included in the graph and a quantity of all edge properties included in the first table, or
        a quantity of all nodes included in the graph and a quantity of all node properties included in the second table, and
        the generating being performed by the device; and
    providing, for display, the textual representation of the graph object,
        the providing the textual representation being performed by the device.

2. The method of claim 1, where the data structure is a sparse matrix; and
    where a set of rows of the sparse matrix represent a set of first nodes of the set of edges and a set of columns of the sparse matrix represent a set of second nodes of the set of edges.

3. The method of claim 1, where a value of an edge index, of the set of edge indices, represents a weight of an edge corresponding to the edge index.

4. The method of claim 1, where the graph is a digraph and the data structure is a matrix; and
    where the matrix is associated with representing a directionality of an edge represented by a particular edge index of the set of edge indices of the matrix.

5. The method of claim 1, where receiving the command comprises:
    receiving a first command associated with identifying a set of source nodes,
        the set of source nodes being included in the set of nodes;
    receiving a second command associated with identifying a set of target nodes,
        the set of target nodes being included in the set of nodes; and
    where creating the graph object comprises:
        creating the graph object based on the set of source nodes and the set of target nodes.

6. The method of claim 1, where receiving the command comprises:
   receiving a particular command associated with identifying an adjacency matrix; and
   where creating the graph object comprises:
      creating the graph object based on the adjacency matrix.
7. The method of claim 1, where receiving the command comprises:
   receiving one or more particular commands associated with identifying at least one of an edge table or a node table; and
   where creating the graph object comprises:
      creating the graph object based on at least one of the edge table or the node table.
8. The method of claim 1, further comprising:
   receiving another command to perform an operation on the graph object;
   performing, based on the other command, the operation on the graph object to generate an output; and
   storing the output.
9. The method of claim 1, where creating the graph object includes:
   creating a self-loop in the graph object dependent upon whether an omit self-loop argument is used when creating the graph object.
10. The method of claim 1, further comprising:
    receiving another command to perform an operation on the graph object; and
    altering, based on the other command, the second table to include a row or a column associated with representing a node property to be added to the set of node properties.
11. The method of claim 1, where the textual representation of the graph object indicates at least one of:
    a numerical representation of the quantity of all edges included in the graph and a numerical representation of the quantity of all edge properties included in the first table, or
    a numerical representation of the quantity of all nodes included in the graph and a numerical representation of the quantity of all node properties included in the second table.
12. A device, comprising:
    one or more processors to:
       receive information associated with a graph;
       receive a command to generate a graph object based on the information associated with the graph;
       create, based on the command and the information associated with the graph, the graph object,
          the graph object representing the graph,
          where the one or more processors, when creating the graph object, are to:
             create a first data type, included in the graph object, associated with representing one or more edges of the graph and one or more nodes of the graph,
             create a second data type, included in the graph object, associated with representing one or more properties associated with the one or more edges of the graph and the one or more nodes of the graph,
             the first data type being different from the second data type; and
       generate a textual representation of the graph object that is different than a representation of the graph object stored in memory,
          the textual representation of the graph object being separate from a graphical representation of the graph object and indicating at least one of:
             a list of all edges of the graph and corresponding values for the one or more properties, or
             a list of all nodes of the graph and corresponding values for the one more properties; and
       provide, for display, the textual representation of the graph object.
13. The device of claim 12, where the one or more processors are further to:
    receive another command to perform an operation on the graph object;
    perform, based on the other command, the operation on the graph object to generate an output; and
    store the output.
14. The device of claim 13, where the other command performs at least one of:
    a modification operation,
    an inspection operation,
    a search operation,
    a path operation,
    a matrix representation operation,
    a node information operation,
    a visualization operation, or
    a visualization alteration operation.
15. The device of claim 13, where the second data type is a column; and
    where the one or more processors are further to:
       determine that the other command is associated with adding another property to the one or more properties; and
    where the one or more processors, when performing the operation on the graph object, are to:
       add another column to a data structure storing information identifying the one or more properties; and
       cause the other column to include information associated with representing the other property.
16. The device of claim 12, where the first data type is an object data type that includes a sparse matrix.
17. A non-transitory computer-readable medium storing instructions, the instructions comprising:
    one or more instructions that, when executed by one or more processors, cause the one or more processors to:
       receive a command to create an object,
          the object being associated with representing a set of nodes,
          a first node, of the set of nodes, being connected to a second node, of the set of nodes via an edge, of a set of edges;
       create, based on the command, the object,
          where the one or more instructions, that cause the one or more processors to create the object, cause the one or more instructions to:
             create a data structure, included in the object, associated with representing the set of nodes and the set of edges,
             create a first table, included in the object, associated with representing a set of properties associated with the set of nodes,
             create a second table, included in the object, associated with representing a set of properties associated with the set of edges;
       generate a textual representation of the object that is different than a representation of the object stored in memory, the textual representation of the object being separate from a graphical representation of the object and indicating at least one of:
a list of all edges of the set of edges and corresponding values for the set of properties associated with the set of edges, or
a list of all nodes of the set of nodes and corresponding values for the set of properties associated with the set of nodes; and
provide, for display, the textual representation of the object.

18. The non-transitory computer-readable medium of claim 17, where the object is a graph object or a digraph object; and
where the one or more instructions, when executed by the one or more processors, cause the one or more processors to:
receive another command,
the other command being associated with plotting the graph object or the digraph object; and
generate, based on the other command, a plot representing the set of nodes and the set of edges,
the plot being associated with illustrating a graph represented by the graph object or a digraph represented by the digraph object.

19. The non-transitory computer-readable medium of claim 17, where the set of nodes includes one or more nodes that are unconnected by one or more edges of the set of edges.

20. The non-transitory computer-readable medium of claim 17, where the edge is associated with an edge weight property,
the edge weight property having a value of zero.

21. The non-transitory computer-readable medium of claim 17, where the one or more instructions, when executed by the one or more processors, further cause the one or more processors to:
receive information identifying an adjacency matrix; and
where the one or more instructions, that cause the one or more processors to create the object, cause the one or more processors to:
create the object based on the adjacency matrix.

* * * * *